(12) United States Patent
Konishi et al.

(10) Patent No.: US 8,649,074 B2
(45) Date of Patent: Feb. 11, 2014

(54) IMAGE CAPTURE APPARATUS AND MALTIFUNCTION APPARATUS

(75) Inventors: Hiroto Konishi, Tokyo (JP); Takashi Saito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 59 days.

(21) Appl. No.: 13/368,767

(22) Filed: Feb. 8, 2012

(65) Prior Publication Data

US 2012/0206777 A1 Aug. 16, 2012

(30) Foreign Application Priority Data

Feb. 10, 2011 (JP) .................. 2011-027583

(51) Int. Cl.
*H04N 1/04* (2006.01)
(52) U.S. Cl.
USPC ............ 358/498; 358/474; 358/497; 358/496
(58) Field of Classification Search
USPC .................. 358/498, 474, 497, 496
See application file for complete search history.

(56) References Cited

U.S. PATENT DOCUMENTS

| 7,755,810 B2* | 7/2010 | Kuse .............................. 358/474 |
| 8,223,406 B2* | 7/2012 | Osakabe ....................... 358/474 |
| 2008/0158621 A1* | 7/2008 | Hamada et al. ............... 358/498 |
| 2009/0225377 A1* | 9/2009 | Yokota et al. ................. 358/498 |
| 2010/0245949 A1* | 9/2010 | Nakakita et al. ............. 358/498 |

FOREIGN PATENT DOCUMENTS

JP 02-089765 * 3/1990
JP 2005-005957 A 1/2005

* cited by examiner

*Primary Examiner* — Houshang Safaipour
(74) *Attorney, Agent, or Firm* — Marvin A. Motsenbocker; Mots Law, PLLC

(57) ABSTRACT

An image capture apparatus includes a platen, an image capturing device movable with respect to the platen along a movement direction and configured to capture an image of a medium placed on the platen, and an attached member provided adjacent to the platen. The attached member or the image capturing device includes an inclined edge inclined with respect to a movement direction of the image capturing device.

20 Claims, 13 Drawing Sheets

IMAGE CAPTURE APPARATUS AND MALTIFUNCTION APPARATUS

CROSS REFERENCE TO RELATED APPLICATIONS

This application claims priority based on 35 USC 119 from prior Japanese Patent Application No. 2011-027583 filed on Feb. 10, 2011, entitled "IMAGE CAPTURE APPARATUS AND MULTIFUNCTION APPARATUS", the entire contents of which are incorporated herein by reference.

BACKGROUND OF THE INVENTION

1. Field of the Invention

The present disclosure relates to an image capture apparatus and a multifunction apparatus.

2. Description of Related Art

A conventional multifunction apparatus includes plural functions such as printing, copying, facsimileing, and image capturing (scanning). The multifunction apparatus thus includes a printer serving as an image formation apparatus to form an image on a sheet and a scanner serving as an image capture apparatus to capture an image of an original or document.

The scanner includes an automatic document feeder (ADF). The ADF feeds document sheets with a conveyance roller(s) from an input tray to a scan position opposite to an ADF platen glass, and discharges the document sheets to an output tray with a discharge roller(s). When each document sheet is passing through the scan position, an image of the document sheet is captured by the image capturing sensor, serving as an image capturing device, provided opposite to the ADF platen glass. The document having passed through the scan position is guided to be separated from the ADF platen glass by a pickup guide provided adjacent to the ADF platen glass (for example, see, Japanese Patent Application Laid-Open No. 2005-5957).

SUMMARY OF THE INVENTION

An object of an embodiment of the invention is to provide an image capture apparatus or a multifunction apparatus capable of smoothly moving an image capturing device.

An aspect of the invention is an image capture apparatus including: a platen; an image capturing device movable with respect to the platen along a movement direction and configured to capture an image of a medium placed on the platen; and an attached member provided adjacent to the platen. The attached member or the image capturing device includes an inclined edge inclined with respect to the movement direction of the image capturing device.

According to the aspect of the invention, the image capturing device can move smoothly.

DETAILED DESCRIPTION OF EMBODIMENTS

Figure 1:
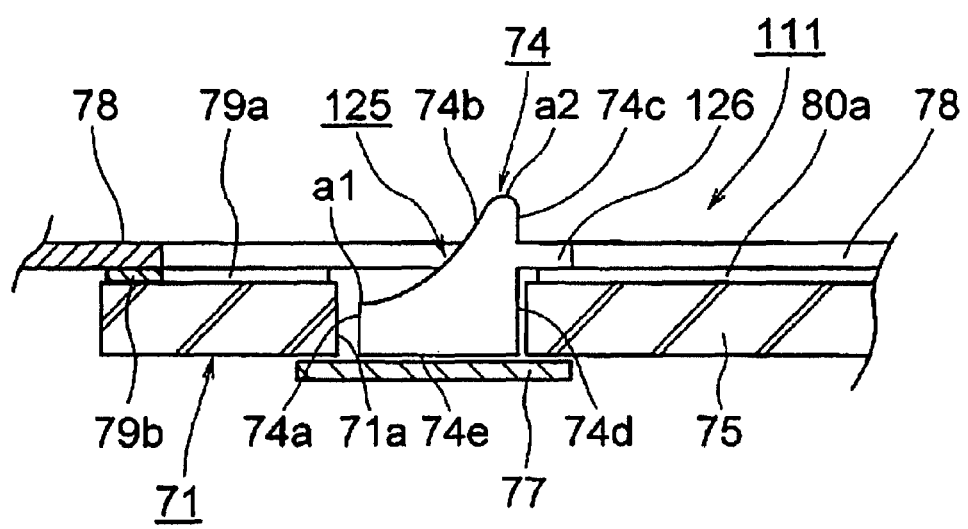
FIG. 1 is a fragmentary sectional view of a platen according to the first embodiment of the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Figure 2:
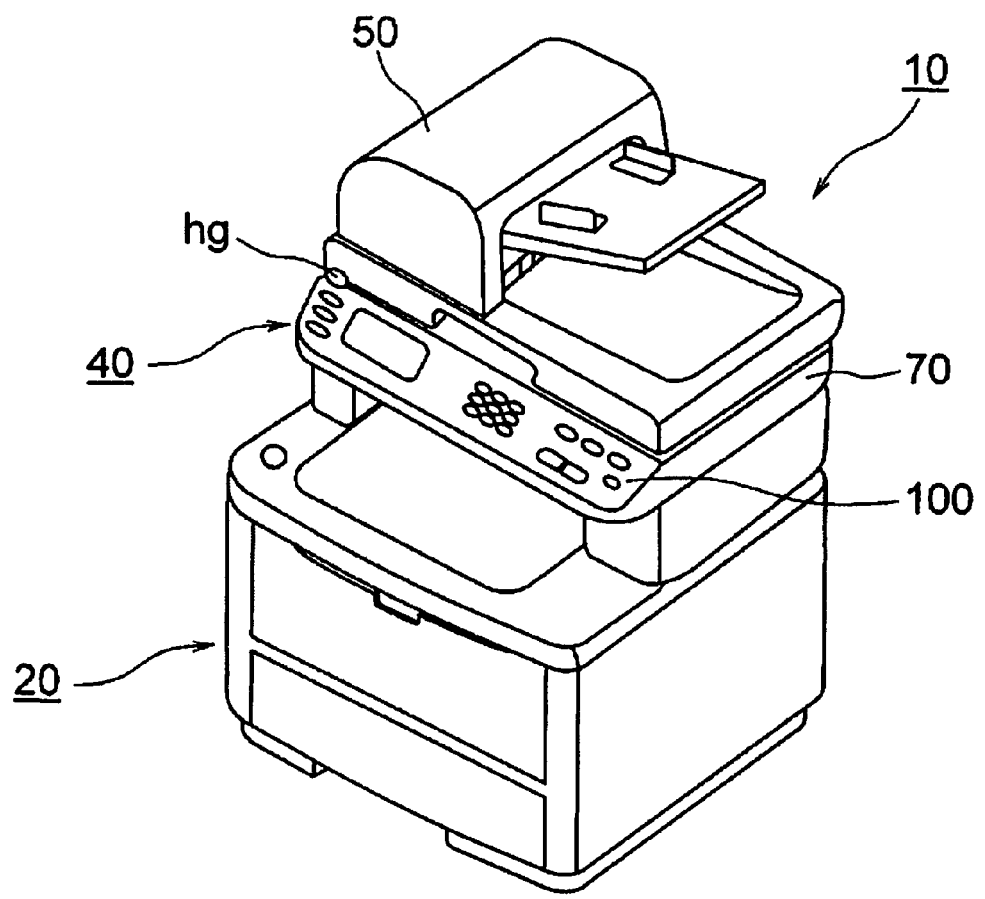
FIG. 2 is a perspective view of a multifunction apparatus according to the first embodiment of the invention.

FIG. 2 is a perspective view of a multifunction apparatus according to the first embodiment of the invention.

As shown in FIG. 2, multifunction apparatus 10 includes: printer 20, serving as an image formation apparatus, configured to form an image on a sheet of paper (not shown) serving as a recording medium; and scanner 40, serving as an image capture apparatus, provided above printer 20 and configured to obtain an image of an unillustrated document (original). Printer 20 and scanner 40 are mechanically connected to each other with an unillustrated mechanical connection member(s) and are electrically connected to each other with an unillustrated electric member(s).

Scanner 40 includes image capture unit 70 configured to scan or capture an image of a document; and automatic document feeder (ADF) 50 provided above image capture unit 70 and configured to automatically feed unillustrated document sheets serving as first media to be scanned. ADF 50 is pivotable with respect to image capture unit 70 about hinge hg as a pivot center. Note that numeral 100 designates an operation panel, serving as an operation part or a control part, to input an instruction to multifunction apparatus 10. Operation panel 100 is provided with buttons or keys serving as operation elements and a LED display serving as a display.

Multifunction apparatus 10 is operable to form an image on a sheet, such as a print sheet, by means of printer 20 in accordance with image data that are obtained by scanner 40 and then transmitted from scanner 40 to printer 20, or in accordance with image date from an unillustrated external apparatus such as a PC or the like. Multifunction apparatus 10 is also operable to transmit, by means of a facsimile function, image data that are obtained by scanner 40 to an unillustrated external facsimile machine, as well as to transmit image data that are obtained by scanner 40 to an external electric device such as a PC, a USB memory or the like.

Next, printer 20 will be described.

Figure 3:
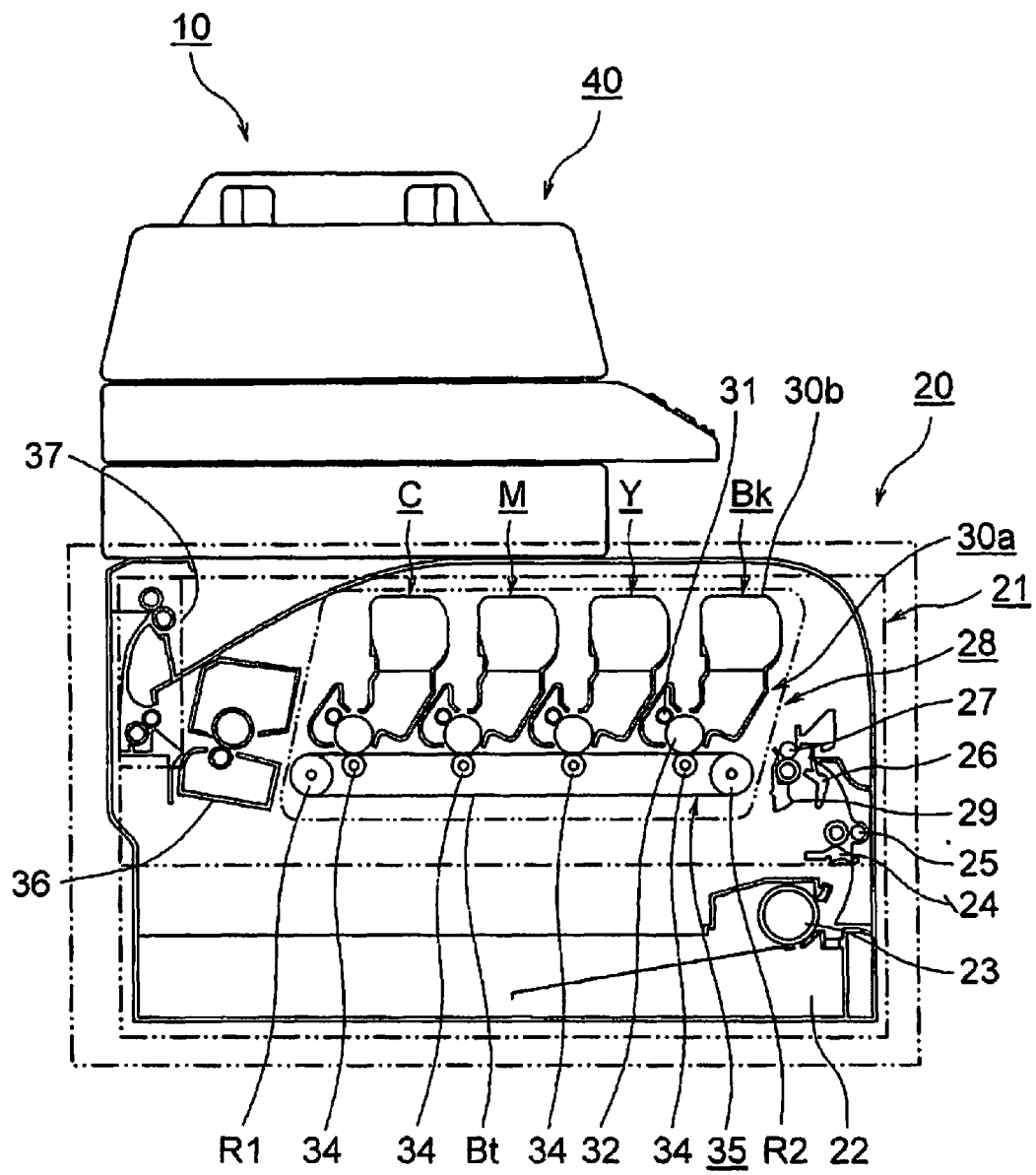
FIG. 3 is a diagrammatic view of a printer according to the first embodiment of the invention.

FIG. 3 is a diagrammatic view of printer 20 according to the first embodiment of the invention.

In FIG. 3, numeral 21 designates a print mechanism to electro-photographically form an image on a sheet. Numeral 22 designates a sheet cassette, serving as a medium container, provided beneath print mechanism 21 and configured to contain sheets therein. Numeral 23 designates a feed roller, serving as a feeder, having an unillustrated one-way clutch and configured to feed sheets one by one from sheet cassette 22 to print mechanism 21. Numeral 24 designates a sensor, serving as a first detector, to detect a sheet that is fed by feed roller 23; numeral 25 designates resist rollers to correct skew of the sheet; numeral 26 designates a sensor, serving as a second detector, to detect the sheet that is passed through resist rollers 25; numeral 27 designates a conveyance roller to convey the sheet to image formation section 28 provided in print mechanism 21; and numeral 29 designates a write sensor, serving as a third detector, to detect the sheet in order to determine a start timing of formation of the developer image by image formation section 28.

Image formation section 28 includes image formation units (print process cartridges) Bk, Y, M, and C configured to form a developer image of black, yellow, magenta, and cyan, respectively. Each image formation unit Bk, Y, M, and C includes image formation unit main body 30a and toner cartridge 30b, serving as a developer cartridge or a developer container, detachably attached to image formation unit main body 30a. Each image formation unit main body 30a includes photosensitive drum 32 serving as an image carrier, charge roller 31 serving as a charge device to uniformly charge the surface of photosensitive drum 32, and an unillustrated development device or development unit configured to attach toner (developer) of a corresponding color to a latent image formed on the surface of photosensitive drum 32 thereby developing a toner image (a developer image) of a corresponding color.

An unillustrated LED head or an exposure device is provided facing each photosensitive drum 32. The LED head is configured to emit light onto the uniformly-charged surface of photosensitive drum 32 to form a latent image (an electrical latent image).

Provided beneath developer image formation units Bk, Y, M, and C is conveyance belt unit 35 serving as an image transfer unit. Conveyance belt unit 35 includes drive roller R1, driven roller R2, belt Bt wound around drive roller R1 and driven roller R2 in a tension state such that an upper line of belt Bt can run along a line of developer image formation units Bk, Y, M, and C, and image transfer rollers 34, serving as image transfer devices, provided respectively facing photosensitive drums 32 with the upper line of belt Bt between photosensitive drums 32 and image transfer rollers 34.

Numeral 36 designates a fixation device or a fuser device, and numeral 37 designates a sheet discharge unit to discharge the sheets to the outside of printer 20.

Next, operation of printer 20 will be described.

In each of developer image formation units Bk, Y, M, and C, charge roller 31 uniformly charges the surface of photosensitive drum 32. The LED head exposes light to form an electrostatic latent image on the charged surface of photosensitive drum 32, and then the development device develops the latent image with toner thereby forming a toner image.

Meanwhile, feed roller 23 feeds sheets one by one from sheet cassette 22 to image formation section 28. Then, while belt Bt in image formation section 28 conveys the sheet along the series of developer image formation units Bk, Y, M, and C, image transfer rollers 34 transfer the toner images of respective colors from photosensitive drums 32 onto the sheet, thereby forming a multi-color or mono-color toner image on the sheet.

Next, while the sheet having the toner image thereon passes through fixation device 36, fixation device 36 fixes the toner image to the sheet, thereby forming an image on the sheet. Sheet discharge unit 37 discharges the sheet out of printer 20.

Next, scanner 40 will be described.

Figure 4:
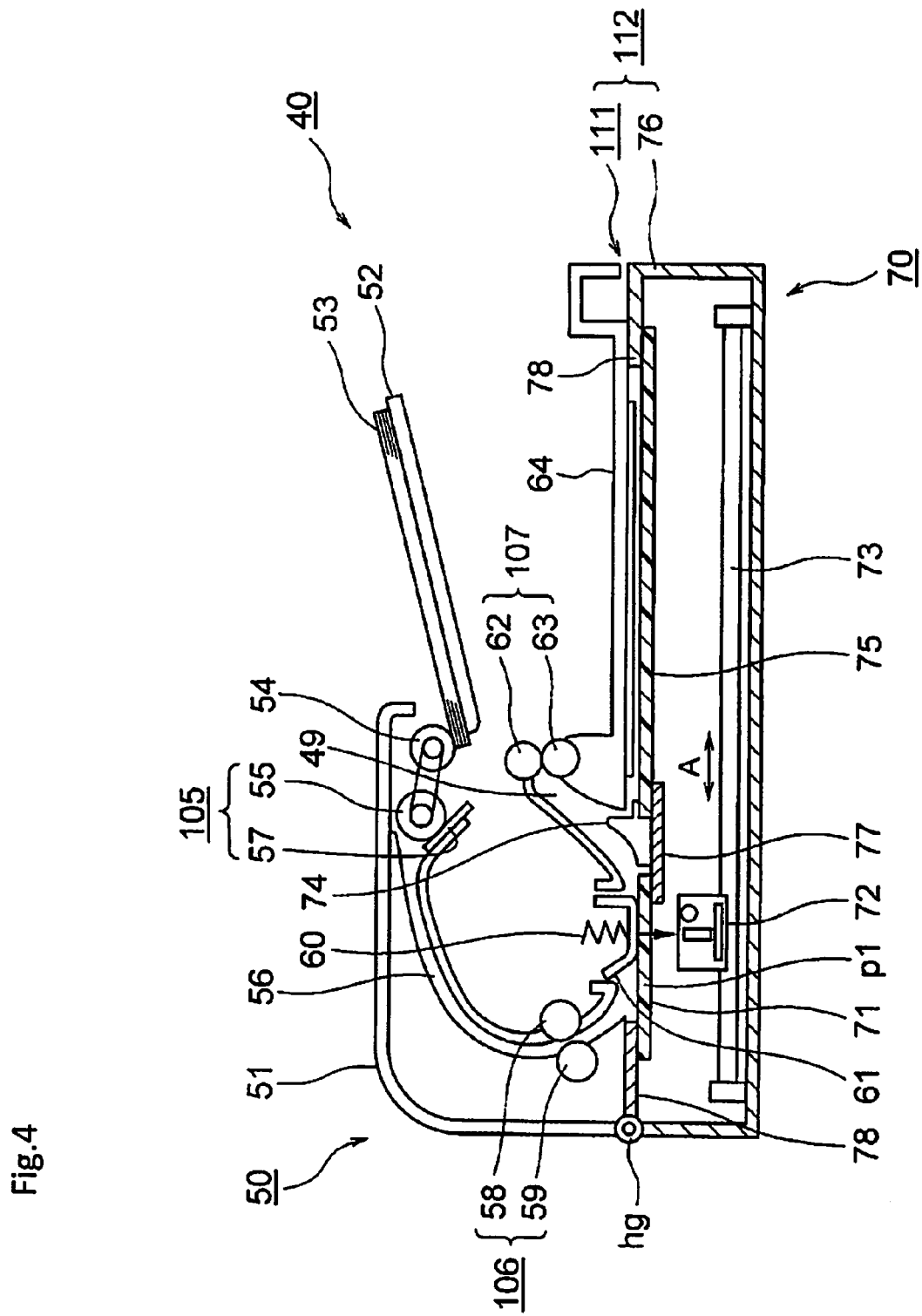
FIG. 4 is a sectional view of a scanner according to the first embodiment of the invention.
Figure 5:
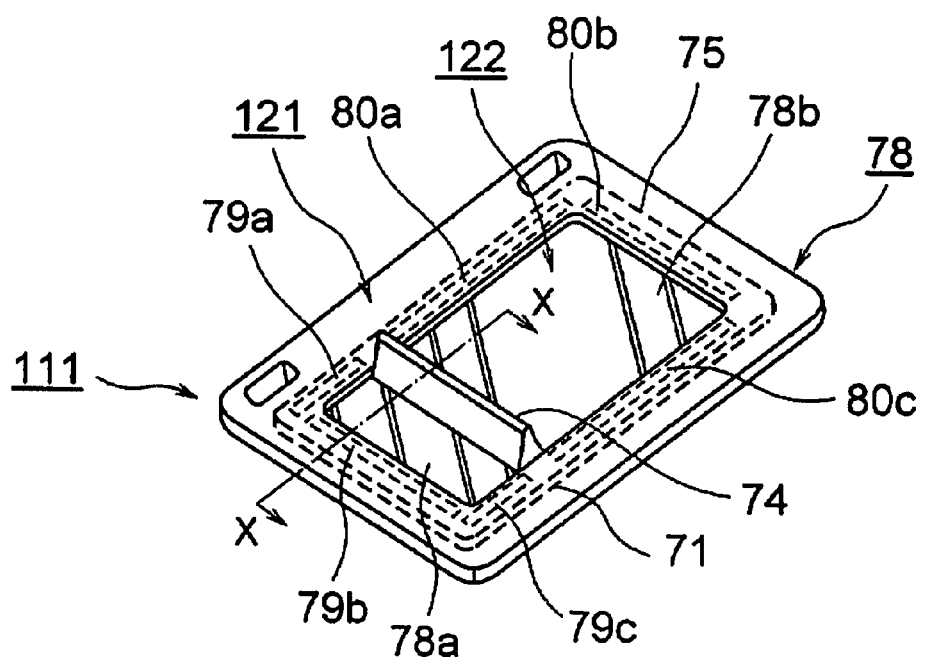
FIG. 5 is a perspective view of the platen according to the first embodiment of the invention.
Figure 6:
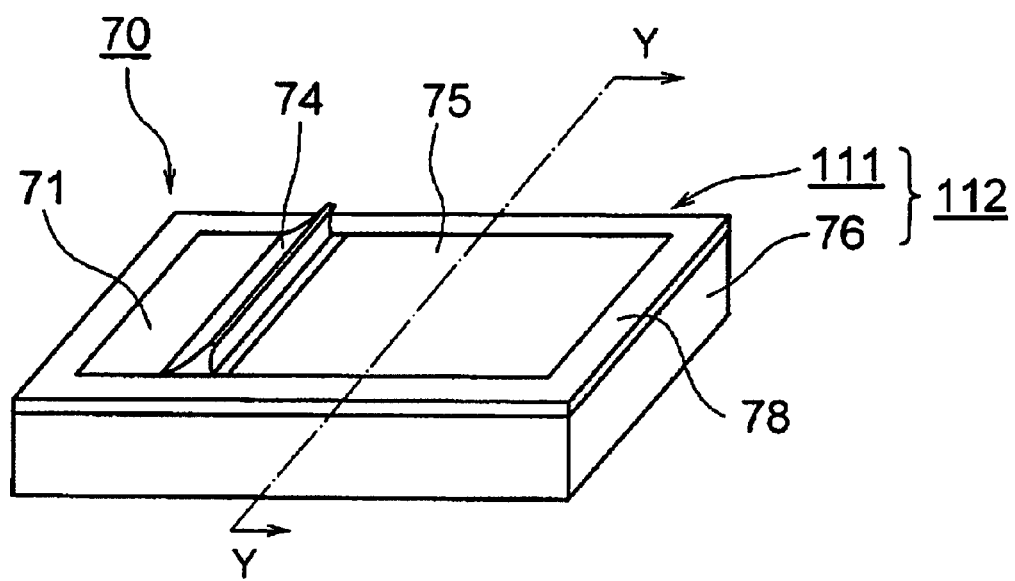
FIG. 6 is a perspective view of an image capture unit according to the first embodiment of the invention.
Figure 7:
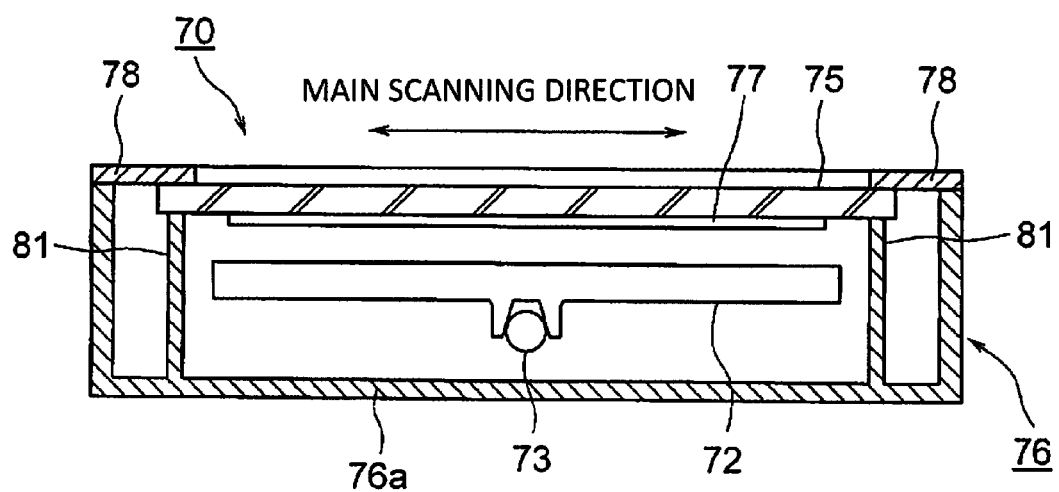
FIG. 7 is a sectional view of the image capture unit according to the first embodiment of the invention.

FIG. 1 is a fragmentary sectional view of a platen according to the first embodiment. FIG. 4 is a sectional view of the scanner according to the first embodiment. FIG. 5 is a perspective view of the platen according to the first embodiment. FIG. 6 is a perspective view of the image capture unit according to the first embodiment. FIG. 7 is a sectional view of the image capture unit according to the first embodiment. Note that FIG. 1 shows a cross section taken along the X-X line in FIG. 5 and FIG. 7 shows a cross section taken along the Y-Y line in FIG. 6.

As described above, scanner 40 includes image capture unit 70 and ADF 50. ADF 50 is pivotable with respect to image capture unit 70 about hinge hg.

ADF 50 includes: cover 51; document input tray 52, serving as a medium input tray or stacker, obliquely projecting from an upper end portion of cover 51; and document output tray 64, serving as a medium output tray or stacker, provided at a lower end of cover 51. ADF 50 is configured to feed document sheets 53, set on document input tray 52, to scan position P1 to scan document sheets 53 and then discharge scanned document sheets 53 to document output tray 64.

Document input tray 52 is provided with pick-up roller 54, serving as a feeder, to feed sheets of document 53. Pick-up roller 54 is provided adjacent to separator 105. Separator 105 includes separator roller 55 and separator pad 57 facing separator roller 55. Separator 105 separates one by one the sheets of document 53 fed from document tray 52.

In cover 51, feed path 56, along which sheets of document 53 are conveyed, extends from separator 105 through conveyance roller pair 106 to scan position p1. Feed path 56 extends obliquely downward from separator 105 toward conveyance roller pair 106 and then is curved to scan position p1 through conveyance roller pair 106. Conveyance roller pair 106 includes conveyance roller 58 and pressure roller 59 provided facing and pressed against conveyance roller 58. Conveyance roller pair 106 further conveys the separated sheet of document 53 from separator 105.

At the lower end of feed path 56 (the downstream end of feed path 56), scan position p1 (ADF scan position p1) is provided between pressing member 61 and ADF platen glass 71 to scan the images of document sheets 53. Pressing member 61 is provided to press a sheet of document 53 that has been conveyed through feed path 56 against ADF platen glass 71, serving as a first transparent plate or section, provided at the top of image capture unit 70. Thus, spring 60 (a bias member), with an upper end fixed to cover 51 in place and a lower end fixed to or in contact with pressing member 61, is provided above pressing member 61 such that spring 60 biases pressing member 61 toward ADF platen glass 71 with a certain bias force.

At a lower position of cover 51, discharge path 49 is provided extending obliquely upward from scan position p1. Discharge roller pair 107 is provided at the downstream end of discharge path 49. Discharge roller pair 107 includes: drive roller 62; and pressure roller 63 opposed to and pressed against drive roller 62, to discharge scanned sheets of document 53 to the outside of ADF 50 to be stacked on document output tray 64. Pressure roller 63 is rotatably attached to an end of document output tray 64.

Image capture unit 70 includes box-shaped bottom frame 76 having an upper opening; and platen 111 (which may be referred to as a document (medium) table, a table top, or the like) covering the upper opening of bottom frame 76. Bottom frame 76 and platen 111 make up housing 112 of image capture unit 70. Shaft 73, serving as a support member, extends in housing 112 and is attached to housing 112. Image capturing sensor 72, serving as an image capturing device, extends in a main scanning direction (=width direction of image capture unit 70). Image capturing sensor 72 is provided movable along shaft 73 in a sub-scanning direction (the direction of arrow A in FIG. 4). In the embodiment, CIS (Contact Image Sensor), serving as an image sensor, is used for image capturing sensor 72. Image capturing sensor 72 includes an unillustrated light source(s), reflector(s), light guide member(s), lens(es), and capturing element(s).

Note that a home position or an initial position of image capturing sensor 72 is provided opposite to scan position p1 via ADF platen glass 71 as shown in FIG. 4. Upon scanning sheets of document 53 fed by ADF 50 at scan position p1, image capturing sensor 72 stays in the home position. On the other hand, upon scanning a document placed on flatbed platen glass 75 of platen 111, image capturing sensor 72 is driven by an unillustrated scanning motor or driver to move from the home position toward flatbed platen glass 75 in the sub-scanning direction, and then move back to the home position to complete the scanning.

Platen 111 includes: top frame 78; ADF platen glass 71 for scanning document sheets 53 fed by ADF 50; document sheet pickup guide 74, serving as a medium guide member, provided adjacent to ADF platen glass 71; flatbed platen glass 75 serving as a second transparent plate or section, provided adjacent to pickup guide 74 and opposite to document output tray 64; strip-shaped seal member 77, serving as a sheet member or an attached member, made of resin material such as PET or the like.

As shown in FIG. 5, top frame 78 is made from a rectangular plate including frame part 121 and rectangular opening 122 encircled by frame part 121. Document sheet pickup guide 74 is provided extending across rectangular opening 122 such that each longitudinal end of pickup guide 74 is fixed to frame part 121, thereby opening 122 is divided by pickup guide 74 into two openings 78a and 78b.

Figure 10:
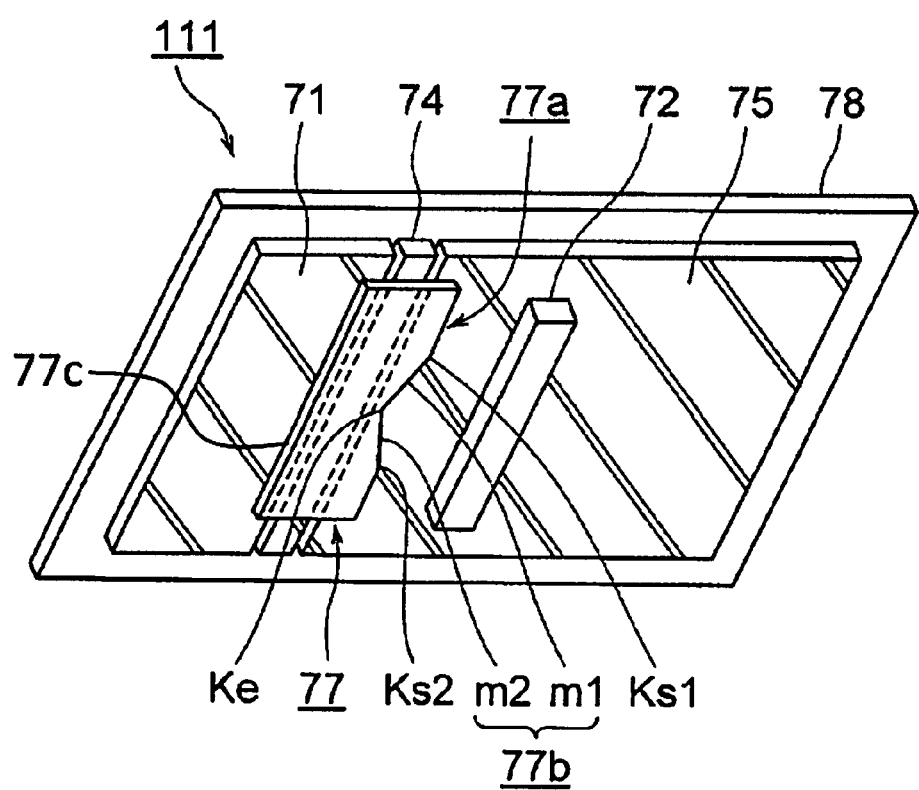
FIG. 10 is a perspective view of the backside of the platen according to the first embodiment of the invention.

As shown in FIG. 10, platen glasses 71 and 75 are adhered to top frame 78 with double-sided adhesive tape 79a to 79c (serving as first fixers) and double-sided adhesive tape 80a to 80c (serving as second fixers), such that platen glasses 71 and 75 respectively cover openings 78a and 78b from the backside of platen 111, with pickup guide 74 between platen glasses 71 and 75.

As shown in FIG. 7, ribs 81, serving as supporting parts, are projected upwardly from bottom wall 76a of bottom frame 76. Widthwise end portions of flatbed platen glass 75 (both ends of flatbed platen glass 75 in the main scanning direction) are supported by ribs 81 of bottom frame 76, respectively.

As shown in FIG. 1, pickup guide 74 includes: main body 125; and projection 126 serving as a locator part projecting from main body 125 toward document output tray 64. Pickup guide 74 functions to pick up document sheet 53 that has passed through scan position p1 from ADF platen glass 71 and to guide document sheet 53 toward discharge roller pair 107 along discharge path 49. Main body 125 is formed with: bottom face 74e; side face 74a provided opposite to edge 71a of ADF platen glass 71; curved (or concaved) inclined face 74b extending obliquely upward from upper end a1 of side face 74a; side face 74c extending vertically downward from the top a2 of pickup guide 74 (the upper end of inclined face 74b) to projection 126; and side face 74d extending vertically downward from projection 126.

Flatbed platen glass 75 is provided under projection 126. Projection 126 is used for a reference position upon positioning an unillustrated original (for example, a booklet document, a book, or the like) on flatbed platen glass 75. The lower end of inclined face 74b, which corresponds to upper end a1 of side face 74a, is provided lower than the upper surface of ADF platen glass 71 with a step between ADF platen glass 71 and pickup guide 74.

Seal member 77 is provided to cover a gap between edge 71a of ADF platen glass 71 and side face 74a of pickup guide 74. To strengthen an attachment of seal member 77, seal member 77 is attached to ADF platen glass 71, pickup guide 74, and flatbed platen glass 75 such that seal member 77 extends from ADF platen glass 71 through pickup guide 74 to flatbed platen glass 75. In this embodiment, seal member 77 is adhered to ADF platen glass 71, pickup guide 74, and flatbed platen glass 75 with adhesion bond.

Next, operation of scanner 40 will be described.

First, the operation to scan document sheets 53 fed by ADF 50 will be described.

Pushing a start button in operation panel 100 by an operator (user) when document 53 is set in document input tray 52 triggers an scan operation. An unillustrated document conveyance motor or driver rotates pick-up roller 54, separator roller 55, conveyance roller pair 106, and discharge roller pair 107. Sheets of document 53 are fed from document input tray 52 to separator 105 by the rotation of pick-up roller 54. At separator 105, while separator pad 57 tries to stop the fed sheet (s) of document 53 from the lower side, separator roller 55 tries to convey the fed sheet (s) of document 53 from the upper side. Thereby, document sheets 53 are conveyed one by one toward conveyance rollers 106 in feed path 56.

Next, document sheet 53 is conveyed by conveyance rollers 106 to scan position p1 along feed path 56. When the document sheet 53 passes through scan position p1, image capturing sensor 72, staying in the home position, captures the image of document sheet 53. When the document sheet 53 passes through scan position p1, pressing member 61 presses document sheet 53 toward ADF platen glass 71 with the bias force of spring 60. Thus, document sheet 53 passes through scan position p1 without being detached from ADF platen glass 71.

Document sheet 53, whose image has been captured at scan position p1, is separated from ADF platen glass 71 by pick-up guide 74 and further conveyed to discharge path 49 by conveyance rollers 106. Document sheet 53 is then discharged to the outside of ADF 50 by discharge roller pair 107, thereby being stacked on document output tray 64.

Meanwhile, when document sheet 53 is conveyed in ADF 50, "dusts" (such as dust that has entered from the outside into feed path 56, and/or paper particles generated by slide-contact between document sheet 53 and the periphery of feed path 56, and the like) become attached to and conveyed with document sheet 53, and may enter into the gap between ADF platen glass 71 and pickup guide 74. If such "dusts" enter through the gap into image capture unit 70 and then are attached to image capturing sensor 72, the power ducts may degrade an accuracy of the image capture.

In the first embodiment, to prevent the dusts from entering into image capture unit 70 through the gap, seal member 77 is attached to ADF platen glass 71, pickup guide 74, and flatbed platen glass 75 such that seal member 77 extends from ADF platen glass 71 through pickup guide 74 to flatbed platen glass 75, as described above.

Next, operation of scanning a booklet document placed on platen 111 will be described.

Figure 8:
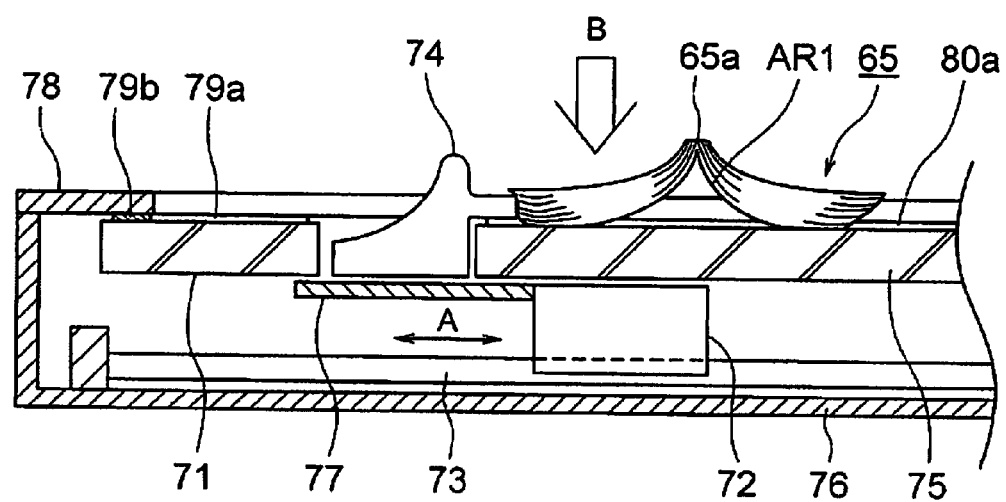
FIG. 8 is a vertical sectional view of the image capture unit upon capturing an image of a booklet document according to the first embodiment of the invention.
Figure 9:
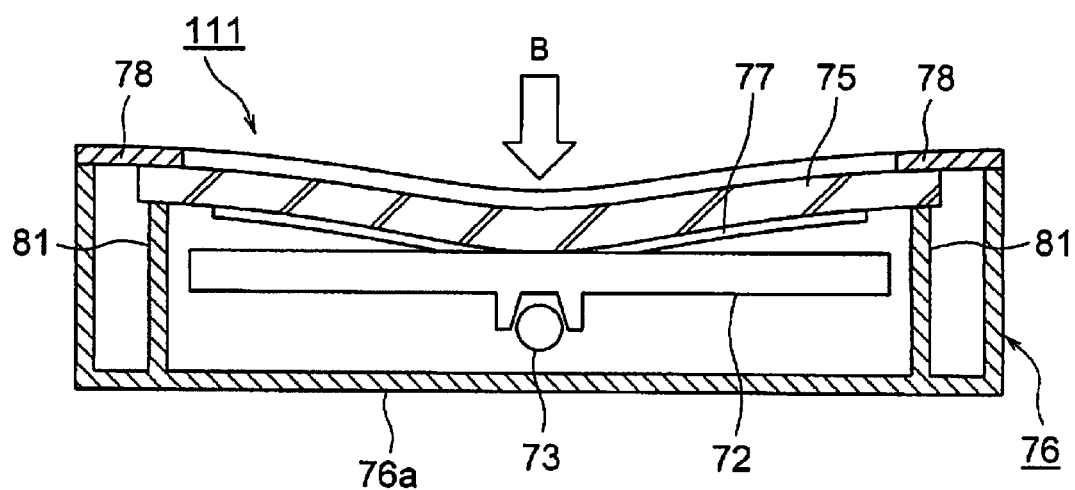
FIG. 9 is a transverse sectional view of the image capture unit upon capturing the image of the booklet document according to the first embodiment of the invention.

FIG. 8 is a vertical sectional view of the image capture unit, illustrating a state where the image capture unit is capturing an image of a booklet document according to the first embodiment. FIG. 9 is a transverse sectional view of the image capture unit, illustrating the state where the image capture unit is capturing the image of the booklet document according to the first embodiment.

An operator rotates ADF 50 about hinge hg (FIG. 2) to open document output tray 64 and expose flatbed platen glass 75. Next, the operator places booklet document 65 on flatbed platen glass 75 and then rotates ADF 50 back to close document output tray 64. In this state, pushing the start button in operation panel 100 by the operator triggers a scan operation. The unillustrated document conveyance motor is activated to move image capturing sensor 72 from the home position toward flatbed platen glass 75 along shaft 73. While image capturing sensor 72 is moving under flatbed platen glass 75 in the sub-scanning direction (the direction of arrow A in FIG. 8), image capturing sensor 72 captures the image of booklet document 65. Note that sheet-type document 53 can be placed on flatbed platen glass 75 to capture an image of sheet-type document 53.

Meanwhile, as shown in FIG. 8, upon scanning booklet document 65 on flatbed platen glass 75 by image capturing sensor 72, adjoining area AR1 of the two facing pages of booklet document 65, which is located inside of spine 65a of booklet document 65, is space away from flatbed platen glass 75. Thus, it may be difficult to precisely capture the image of adjoining area AR1 of two facing pages of booklet document 65.

Therefore, the operator may push document output tray 64 to push booklet document 65 or may directly push booklet document 65 toward flatbed platen glass 75 in a downward direction (direction of arrow B), so as to bring adjoining area AR1 close to flatbed platen glass 75.

Flatbed platen glass 75 and image capturing sensor 72 are provided parallel to each other with a clearance between flatbed platen glass 75 and image capturing sensor 72 in the normal state as shown in FIG. 7. On the other hand, when booklet document 65 is pressed against flatbed platen glass 75, flatbed platen glass 75 is bent downward, as shown in FIG. 9, thereby flatbed platen glass 75 gets closer to image capturing sensor 72 and may come in contact with image capturing sensor 72. Especially, since the embodiment uses image capturing sensor 72 serving as an image sensor to move in a position adjacent to flatbed platen glass 75, flatbed platen glass 75 may come in contact with image capturing sensor 72 even when flatbed platen glass 75 is bent only a little.

Also, since flatbed platen glass 75 is supported by ribs 81 at the widthwise end portions of flatbed platen glass 75 (end portions of flatbed platen glass 75 in the main scanning direction) as described above, flatbed platen glass 75 is bent downward most at a widthwise center of flatbed platen glass 75 (a center of flatbed platen glass 75 in the main scanning direction), when booklet document 65 is pressed against flatbed platen glass 75. Therefore, flatbed platen glass 75 and image capturing sensor 72 get close to each other, or may come in contact with each other, at their widthwise center areas.

Further, in the embodiment, seal member 77 is attached to the lower surfaces of ADF platen glass 71, pickup guide 74 and flatbed platen glass 75 and thus is located lower than the lower surfaces. Accordingly, when flatbed platen glass 75 is pressed and bent downward, a section of seal member 77 that is attached to flatbed platen glass 75 is also bent downward.

Therefore, when the widthwise center of flatbed platen glass 75 is close to or in contact with image capturing sensor 72, a widthwise center of an lower surface of seal member 77 may be located lower than an upper surface of image capturing sensor 72.

If a part of the lower surface of seal member 77 is located lower than the upper surface of image capturing sensor 72 when image capturing sensor 72 moves in the sub-scanning direction to capture an image of booklet document 65, image capturing sensor 72 collides with and is stopped by seal member 77.

To prevent this problem, in the embodiment, seal member 77 is formed with a cutout, serving as an inducting part to induct image capturing sensor 72, to allow image capturing sensor 72 to smoothly move even when flatbed platen glass 75 gets close to or gets in contact with image capturing sensor 72.

Figure 11:
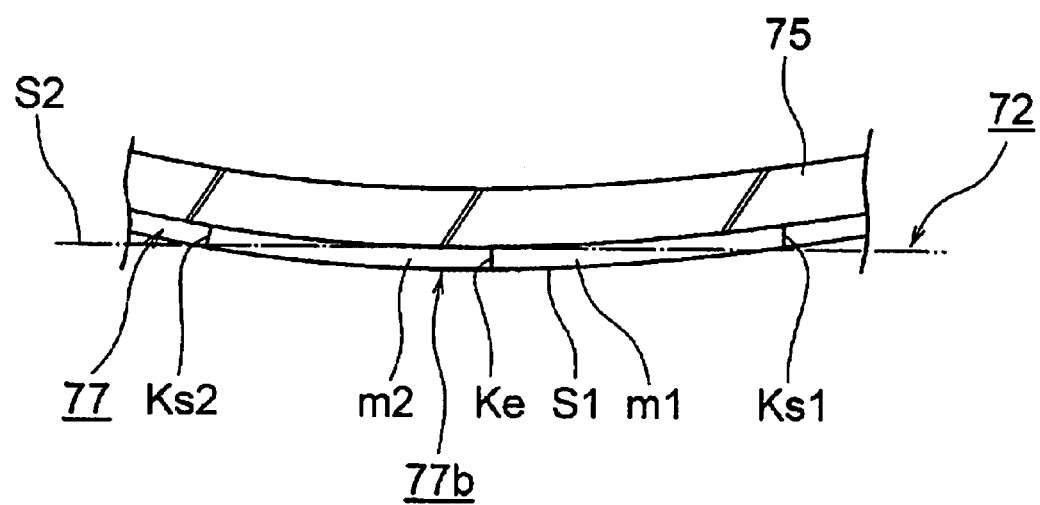
FIG. 11 is an enlarged view of a cutout according to the first embodiment of the invention.

FIG. 10 is a perspective view of the backside of the platen according to the first embodiment. FIG. 11 is an enlarged view of the cutout according to the first embodiment.

As shown in FIG. 10, seal member 77 extends in the main scanning direction and is attached to ADF platen glass 71, pickup guide 74 and flatbed platen glass 75. Seal member 77 has opposed sides: one is first side 77a of the seal member provided proximal to flatbed platen glass 75; and the other is second side 77c provided proximal to ADF platen glass 71. First side 77a of seal member 77 has concave cutout 77b (triangular cutout 77b in this embodiment) at the center of seal member 77 in the main scanning direction. In the embodiment, triangle cutout 77b, serving as the inducting part, has first cutout side edge m1 and second cutout side edge m2, serving as first and second inclined portions. Such cutout side edges m1 and m2 extend from cutout start points Ks1 and Ks2, which are located in places on first side 77a of sealing member 77, to cutout end point Ke, which is located between first side 77a and second side 77c of sealing member 77. In other words, cutout start points Ks1 and Ks2 are both sides of an open end of triangle cutout 77b, and cutout end point Ke is the apex of triangle cutout 77b. Cutout end point Ke is located on flatbed platen glass's side from the gap between pickup guide 74 and ADF platen glass 71. First and second cutout side edges m1 and m2 of cutout 77b extend obliquely with respect to the sub-scanning direction and are symmetrical to each other with respect to the sub-scanning direction.

In the state where flatbed platen glass 75 and seal member 77 are not bent, cutout start points Ks1, Ks2 and cutout end point Ke are provided at the same level or height such that cutout side edges m1 and m2 of cutout 77b extend horizontally. On the other hand, in the state where flatbed platen glass 75 and seal member 77 are not bent downward, as shown in FIG. 11, cutout end point Ke is located lower than cutout start points Ks1 and Ks2 such that cutout side edges m1 and m2 extend obliquely downward from cutout start points Ks1 and Ks2 to cutout end point Ke in height.

As shown in FIG. 11, when flatbed platen glass 75 is bent downward and gets close to, or gets in contact with, image capturing sensor 72 at the center are of flatbed platen glass 75 in the main scanning direction upon capturing the image of booklet document 65 on flatbed platen glass 75, lower surface S1 of seal member 77 may be located lower than upper face S2 of image capturing sensor 72 at the center area of seal member 77 in the main scanning direction. However, since seal member 77 of the first embodiment has cutout 77b at the center of seal member 77 in the main scanning direction, cutout start points Ks1 and Ks2 of seal member 77 are located higher than upper face S2 of image capturing sensor 72 when image capturing sensor 72 reaches first side 77a of seal member 77 upon image capturing sensor 72 moving toward ADF platen glass 71. Therefore, image capturing sensor 72 does not come in contact with first side edge 77a of seal member 77.

Further, in the state where flatbed platen glass 75 and seal member 77 are bent downward, cutout side edges m1 and m2 extend obliquely downward from cutout start points Ks1 and Ks2 to cutout end point Ke. Thus, in the state where flatbed platen glass 75 and seal member 77 are bent downward by a large extent, image capturing sensor 72 comes in contact with cutout side edges m1 and m2 in a place when image capturing sensor 72 moves toward ADF platen glass 71. That is, before image capturing sensor 72 comes in contact with cutout side edges m1 and m2 of seal member 77, image capturing sensor 72 is not in contact with seal member 77.

After image capturing sensor 72 comes in contact with cutout side edges m1 and m2, image capturing sensor 72 moves in slide-contact with cutout side edges m1 and m2. The contacts between image capturing sensor 72 and cutout side edges m1 and m2 are not line contacts but rather are point contacts, and the slide contact friction (resistance) is thus extremely small. Therefore, image capturing sensor 72 can smoothly move, since seal member 77 does not hinder the movement of image capturing sensor 72. Note that, when image capturing sensor 72 moves in slide-contact with cutout side edges m1 and m2 of seal member 77, the image capturing sensor moves downward as it is being guided by cutout side edges m1 and m2.

In the first embodiment, cutout 77b is formed in a triangular shape and cutout side edges m1 and m2 of cutout 77b are straight lines. However, cutout 77b may be formed in another shape, such as a hemicycle or semi-ellipse, and cutout side edges m1 and m2 of cutout 77b may be curved.

In the first embodiment, cutout 77b is formed at first side 77a of seal member 77 located proximal to flatbed platen glass 75, but is not formed at second side 77c located proximal to ADF platen glass 71. This is because, in the state where booklet document 65 is pressed down against flatbed platen glass 75, flatbed platen glass 75 is bent but ADF platen glass 71 is not bent or is bent by a little extent. That is, image capturing sensor 72 is more likely to come in contact with side 77a of seal member 77 without cutout 77b when image capturing sensor 72 moves from the side of flatbed platen glass 75 toward the home position (the side of ADF platen glass 71), whereas image capturing sensor 72 hardly comes in contact with side 77c of seal member 77 when image capturing sensor 72 moves from the home position (the side of ADF platen glass 71) toward flatbed platen glass 75.

As described above, according to the first embodiment, seal member 77 is formed with triangle cutout 77b. Therefore, even if image capturing sensor 72 comes in contact with seal member 77 in the state where booklet document 65 is pressed against flatbed platen glass 75 and flatbed platen glass 75 is thus bent downward, the slide contact friction between image capturing sensor 72 and seal member 77 is small. Consequently, image capturing sensor 72 can move smoothly.

Next, a second embodiment of the invention will be described. In the following description of the second embodiment, the same reference numerals will be given to the same components as those in the first embodiment, and detailed description of and effects due to these components will be omitted.

Figure 12:
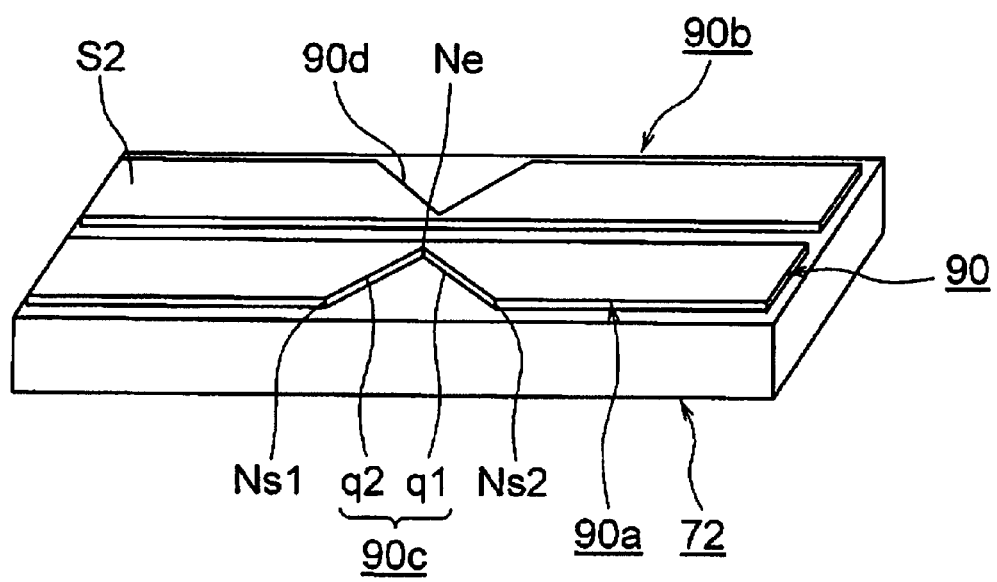
FIG. 12 is a perspective view of an image capturing sensor according to a second embodiment of the invention.

FIG. 12 is a perspective view of the image capturing sensor of the second embodiment.

In the second embodiment, to prevent a scattered reflection of light that is emitted from the light guide member of image capturing sensor 72 to sheet-type document 53 or booklet document 65, light shield member 90 (or an attached member) is provided on and covers upper face S2 of image capturing sensor 72 (a face of image capturing sensor 72 that faces scan position p1 (FIG. 4)). In the second embodiment, both sides 90a and 90b of light shield member 90 respectively have cutouts 90c and 90d (triangle cutouts 90c and 90d in the second embodiment), serving as inducting parts, at the center of light shield member 90 in the main scanning direction.

Cutouts 90c and 90d have the same structure. The structure of cutout 90c is thus only described to omit redundant explanation. Cutout 90c has first and second cutout side edges q1 and q2 extending from cutout start points Ns1 and Ns2, which are provided in place on side 90a of light shield member 90, to cutout end point Ne, which is located between side 90b and side 90a of light shield member 90.

For example, in the state where flatbed platen glass 75 is bent downward such that flatbed platen glass 75 gets close to or gets in contact with image capturing sensor 72, lower surface S1 (FIG. 11) of seal member 77 (a sheet member) may be located lower than upper face S2 of image capturing sensor 72 at the center of image capturing sensor 72 in the main scanning direction. However, since side 90a of image capturing sensor 72 has cutout 90c at the center of image capturing sensor 72 in the main scanning direction, cutout start points Ns1 and Ns2 are located lower than lower surface S1 of seal member 77 when image capturing sensor 72 reaches first side 77a of seal member 77 while image capturing sensor 72 is moving from the side of flatbed platen glass 75 toward ADF platen glass 71 to scan booklet document 65. Therefore, image capturing sensor 72 does not come in contact with first side 77a of seal member 77.

When image capturing sensor 72 moves further toward ADF platen glass 71, cutout side edges q1 and q2 of light shield member 90 of image capturing sensor 72 come in contact with first side 77a of seal member 77 in a place. That is, before that, image capturing sensor 72 does not make contact with seal member 77.

After cutout side edges q1 and q2 of image capturing sensor 72 come in contact with seal member 77, image capturing sensor 72 moves while cutout side edges q1 and q2 are in slide-contact with seal member 77. Since the slide contact between seal member 77 and cutout side edges m1 and m2 of image capturing sensor 72 are not line contacts but are point contacts, the slide contact friction (resistance) is thus extremely small. Therefore, seal member 77 does not hinder the movement of image capturing sensor 72, whereby image capturing sensor 72 can smoothly move. Note that when image capturing sensor 72 moves in slide-contact with seal member 77, the image capturing sensor moves obliquely downward as being guided by cutout side edges q1 and q2.

As described above, according to the second embodiment, light shield member 90 has triangle cutouts 90c and 90d. Therefore, the slide contact friction between image capturing sensor 72 and seal member 77 will be a little, even if image capturing sensor 72 comes in contact with seal member 77 in the state where booklet document 65 is pressed toward flatbed platen glass 75 and flatbed platen glass 75 is thus bent downward. Consequently, image capturing sensor 72 can move smoothly.

Next, a third embodiment of the invention will be described.

Figure 13:
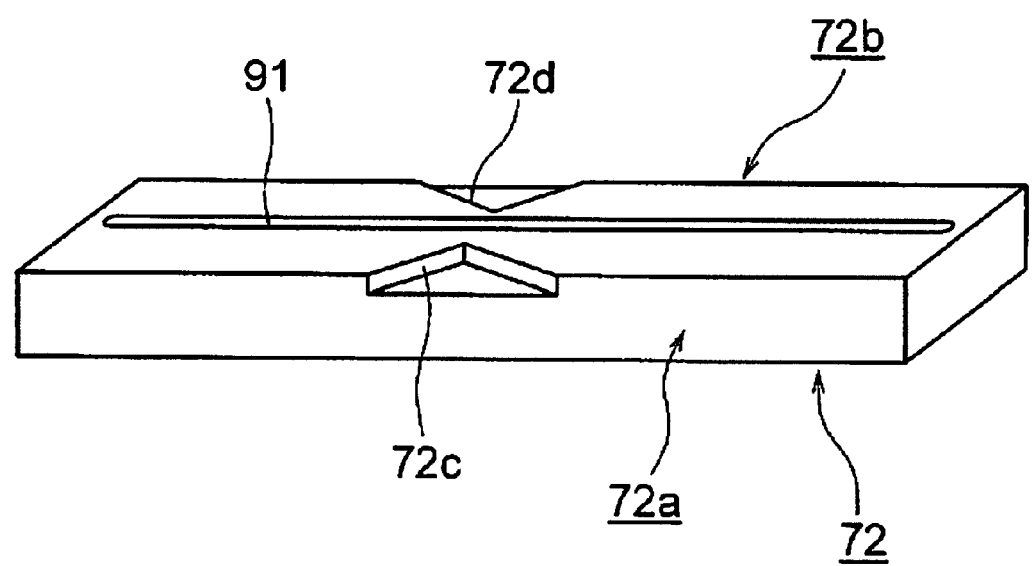
FIG. 13 is a perspective view of the image capturing sensor according to a third embodiment of the invention.

FIG. 13 is a perspective view of an image capturing sensor according to the third embodiment.

In FIG. 13, reference numeral 72 designates image capturing sensor serving as a image capturing device, reference numerals 72a and 72b designate both sides of image capturing sensor 72. Each side 72a and 72b of image capturing sensor 72 has a concave cutout 72c and 72d respectively (triangle cutout 72c and 72d in the third embodiment), serving as inducting parts, at the center area in the main scanning direction and in the vicinity of the upper face of image capturing sensor 72. Note that reference numeral 91 designates a lens.

Printer 20, serving as an image formation apparatus, comprises electrophotographic image formation section 28 equipped with the LED head (serving as an exposure device) in the above embodiments, however, printer 20 may comprise an image formation section of a laser type, an ink-jet type, a dot matrix impact type, or the like.

CIS (Contact Image Sensor) is used for image capturing sensor 72 in the above embodiments; however, other image sensors, such as a CCD image sensor, may be used.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image capture apparatus comprising:
   a platen;
   an image capturing device movable with respect to the platen along a movement direction and configured to capture an image of a medium placed on the platen;
   an attached member provided adjacent to the platen, wherein one of the attached member and the image capturing device includes: a side that faces the other of the attached member and the image capturing device and is orthogonal to the movement direction of the image capturing device; and an inclined edge provided on the side and inclined with respect to the movement direction of the image capturing device; and
   a concave cutout that includes the inclined edge.

2. The image capture apparatus according to claim 1, wherein
   the platen includes a first transparent section and a second transparent section, and
   the attached member is provided between the first transparent section and the second transparent section.

3. The image capture apparatus according to claim 2, wherein
   the attached member includes a side proximal to the second transparent section and the inclined edge is formed at the side of the attached member.

4. The image capture apparatus according to claim 1, wherein
   the platen includes a first transparent section and a second transparent section, and
   the image capturing device is configured to stay still in the vicinity of the first transparent section so as to capture an image of a medium conveyed by an automatic medium feeder and passed by the first transparent section, and to move in the vicinity of the second transparent section to capture an image of a medium placed on the second transparent section.

5. The image capture apparatus according to claim 1, wherein
   the inclined edge comprises a pair of inclined edges symmetrical to each other with respect to the movement direction.

6. The image capture apparatus according to claim 1, wherein
   the attached member is a sheet member.

7. The image capture apparatus according to claim 1, wherein
   the platen includes a first transparent section, a second transparent section, and a guide between the first and second transparent sections, and
   the attached member is a sheet member covering a gap between the first transparent section and the guide or between the second transparent section and the guide.

8. A multifunction apparatus comprising the image capture apparatus according to claim 1 and an image formation apparatus.

9. The multifunction apparatus claim 8, wherein
   the image formation apparatus is configured to form an image based on an image captured by the image capture apparatus.

10. The multifunction apparatus according to claim 8, wherein the image formation apparatus comprises:
    a developer image formation unit configured to form a developer image;
    an image transfer unit configured to transfer the developer image from the developer image formation unit to a medium; and
    a fixation device configured to fix the developer image to the medium.

11. The image capture apparatus according to claim 1, wherein the concave cutout comprises a triangular shaped cutout that is positioned adjacent to the image capturing device.

12. The image capture apparatus according to claim 11, wherein the triangular shaped cutout is positioned such that, when the platen is moved downward to a force exerted on a top surface of the platen, the triangular shaped cutout moves towards the image capturing device such that no contact between the attached member and the image capturing device occurs.

13. The image capture apparatus according to claim 1, wherein the attached member is provided beneath the platen and above the image capturing device.

14. The image capture apparatus according to claim 1, wherein the inclined edge is formed at the attached member and is provided only at a widthwise center portion of the platen in a direction orthogonal to the movement direction.

15. An image capture apparatus comprising:
    a platen including a first surface and a second surface opposed to each other;
    an attached member attached on the second surface of the platen; and
    an image capturing device disposed facing the second surface of the platen, and is configured to capture an image of a medium placed on the platen while moving in a movement direction with respect to the platen;
    wherein one of the attached member and the image capturing device is formed with: a side that faces the other of the attached member and the image capturing device and is orthogonal to the movement direction of the image capturing device; and a cutout recessed from the side and facing the other of the attached member and the image capturing device, the cutout comprising an inclined edge inclined with respect to the movement direction,
    wherein the cutout comprises a triangular shaped cutout that is positioned adjacent to the image capturing device.

16. The image capture apparatus according to claim 15, wherein the triangular shaped cutout is positioned such that, when the platen is moved downward to a force exerted on a top surface of the platen, the triangular shaped cutout moves towards the image capturing device such that no contact between the attached member and the image capturing device occurs.

17. The image capture apparatus according to claim 15, wherein the attached member is provided beneath the platen and above the image capturing device.

18. The image capture apparatus according to claim 15, wherein the inclined edge is formed at the attached member and is provided only at a widthwise center portion of the platen in a direction orthogonal to the movement direction.

19. An image capture apparatus comprising:
   a platen;
   an image capturing device movable with respect to the platen along a movement direction and configured to capture an image of a medium placed on the platen; and
   an attached member provided adjacent to the platen, wherein one of the attached member and the image capturing device includes: a side that faces the other of the attached member and the image capturing device and is orthogonal to the movement direction of the image capturing device; and an inclined edge provided on the side and inclined with respect to the movement direction of the image capturing device,
   wherein the inclined edge is formed at the image capturing device and is provided at each of opposite sides of the image capturing device in the movement direction.

20. An image capture apparatus comprising:
   a platen including a first surface and a second surface opposed to each other;
   an attached member attached on the second surface of the platen; and
   an image capturing device disposed facing the second surface of the platen, and is configured to capture an image of a medium placed on the platen while moving in a movement direction with respect to the platen,
   wherein one of the attached member and the image capturing device is formed with: a side that faces the other of the attached member and the image capturing device and is orthogonal to the movement direction of the image capturing device; and a cutout recessed from the side and facing the other of the attached member and the image capturing device, the cutout comprising an inclined edge inclined with respect to the movement direction, and
   wherein the inclined edge is formed at the image capturing device and is provided at each of opposite sides of the image capturing device in the movement direction.

* * * * *